(12) United States Patent
Epley

(10) Patent No.: US 8,451,102 B2
(45) Date of Patent: *May 28, 2013

(54) METHODS, DEVICES, AND COMPUTER PROGRAM PRODUCTS FOR PROVIDING AMBIENT NOISE SENSITIVE ALERTING

(75) Inventor: Robert Epley, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/489,537

(22) Filed: Jun. 23, 2009

(65) Prior Publication Data

US 2009/0258682 A1    Oct. 15, 2009

Related U.S. Application Data

(63) Continuation of application No. 11/590,237, filed on Oct. 27, 2006, now Pat. No. 7,567,165.

(51) Int. Cl.
*G08B 3/00* (2006.01)
(52) U.S. Cl.
USPC .... 340/392.3; 340/7.58; 455/567; 455/550.1; 381/57
(58) Field of Classification Search
USPC ....... 340/392.3, 7.6, 7.58, 10.1, 7.1; 455/567, 455/550.1, 67.6, 41.2; 381/57
See application file for complete search history.

(56) References Cited

U.S. PATENT DOCUMENTS

| | | |
|---|---|---|
| 3,934,084 A | 1/1976 | Munson et al. |
| 3,963,868 A | 6/1976 | Randmere et al. |
| 4,076,968 A | 2/1978 | Wattenbarger |
| 4,247,955 A | 1/1981 | Weidemann |
| 4,381,488 A | 4/1983 | Fricke et al. |
| 4,628,526 A | 12/1986 | Germer |
| 4,904,992 A | 2/1990 | Grouthause |
| 5,172,597 A | 12/1992 | Hedeen |
| 5,208,867 A | 5/1993 | Stites, III |
| 5,327,506 A | 7/1994 | Stites, III |
| 5,343,523 A | 8/1994 | Bartlett et al. |
| 5,666,426 A | 9/1997 | Helms |
| 5,751,822 A | 5/1998 | Yamaguchi et al. |
| 5,774,565 A | 6/1998 | Benning et al. |
| 5,885,213 A | 3/1999 | Richardson et al. |
| 5,912,965 A | 6/1999 | Boyer |
| 6,122,366 A | 9/2000 | Veschi |
| 6,252,515 B1 | 6/2001 | Mottier et al. |
| 6,363,265 B1 | 3/2002 | Ritter |
| 6,411,928 B2 | 6/2002 | Tsurufuji et al. |
| 6,487,529 B1 | 11/2002 | Miet |
| 6,591,198 B1 | 7/2003 | Pratt |
| 6,754,623 B2 | 6/2004 | Deligne et al. |
| 6,954,657 B2 | 10/2005 | Bork et al. |
| 6,978,010 B1 | 12/2005 | Short et al. |
| 6,988,068 B2 | 1/2006 | Fado et al. |
| 7,112,139 B2 | 9/2006 | Paz Barahona et al. |
| 7,162,212 B2 | 1/2007 | Bennetts et al. |
| 7,567,165 B2 * | 7/2009 | Epley .......................... 340/392.3 |
| 2003/0008687 A1 * | 1/2003 | Nishimura ..................... 455/567 |
| 2005/0282590 A1 * | 12/2005 | Haparnas ....................... 455/570 |
| 2006/0126865 A1 * | 6/2006 | Blamey et al. ................ 381/102 |

* cited by examiner

*Primary Examiner* — Anh V La
(74) *Attorney, Agent, or Firm* — Cantor Colburn LLP

(57) ABSTRACT

Methods, devices, and computer program products for providing ambient noise sensitive alerting. The methods comprise receiving ambient noise, converting the ambient noise to an electrical signal, detecting a parameter of the electrical signal which is indicative of ambient noise, sensing an incoming call or message, and controlling the volume of an audible alert in response to the detected parameter of the electrical signal.

1 Claim, 2 Drawing Sheets

METHODS, DEVICES, AND COMPUTER PROGRAM PRODUCTS FOR PROVIDING AMBIENT NOISE SENSITIVE ALERTING

CROSS-REFERENCE TO RELATED APPLICATIONS

This application is a continuation of U.S. patent application Ser. No. 11/590,237 filed Oct. 27, 2006, the contents of which are incorporated herein by reference in their entirety.

BACKGROUND

Exemplary embodiments relate generally to communications and, more particularly, to methods, devices, and computer program products for providing ambient noise sensitive alerting.

Portable communications devices such as pagers, cellular phones, laptop computers, and personal digital assistants (PDAs), may be used in any of a wide variety of indoor and outdoor environments. One important capability of a portable communications device is to notify the user as to the presence of an incoming call or message. Such notification is often performed using an audible alert. Users may adjust the volume of the audible alert, or disable the alert altogether, by navigating through a sequence of nested menus to select appropriate options. Additionally, some portable communications devices permit selection of a desired melody or ring tone from a menu of predetermined alerts, as well as downloading one or more audio files for use as an audible alert.

The volume of audible alert required to engage the user's attention varies in accordance with the user's current environment and, in particular, with the current ambient noise level. A given audible alert volume may seem annoyingly loud in a quiet meeting room, yet remain virtually inaudible to the user on the street or in a train. At the same time, many users do not wish to endure the inconvenience of repeatedly navigating through nested menus to adjust the audible alert every time the user enters a new environment. These users may opt for a compromise audible alert setting that works in many locations frequented by the user, but is still inappropriately loud or soft for other locations. Accordingly, what is needed is a mechanism by which the volume of an audible alert is automatically adjusted in accordance with ambient noise.

BRIEF SUMMARY

Exemplary embodiments relate to methods of providing ambient noise sensitive alerting. These methods comprise receiving ambient noise, converting the ambient noise to an electrical signal, detecting a parameter of the electrical signal which is indicative of ambient noise, sensing an incoming call or message, and controlling the volume of an audible alert in response to the detected parameter of the electrical signal.

Additional exemplary embodiments include computer program products comprising a storage medium readable by a processing circuit and storing instructions for execution by the processing circuit for facilitating methods of providing ambient noise sensitive alerting. The methods comprise receiving ambient noise, converting the ambient noise to an electrical signal, detecting a parameter of the electrical signal, which is indicative of ambient noise, sensing an incoming call or message, and controlling the volume of an audible alert in response to the detected parameter of the electrical signal.

Additional exemplary embodiments include a device for providing ambient noise sensitive alerting. The device includes a microphone for receiving ambient noise and converting the ambient noise to an electrical signal, an ambient noise level detection mechanism for detecting a parameter of the electrical signal which is indicative of ambient noise, an incoming call sensing mechanism for sensing of an incoming call or message, and an audio signal generator operatively coupled to a loudspeaker for providing an audible alert, wherein the incoming call sensing circuitry controls the volume of the audible alert in response to the detected parameter of the electrical signal.

Other devices, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
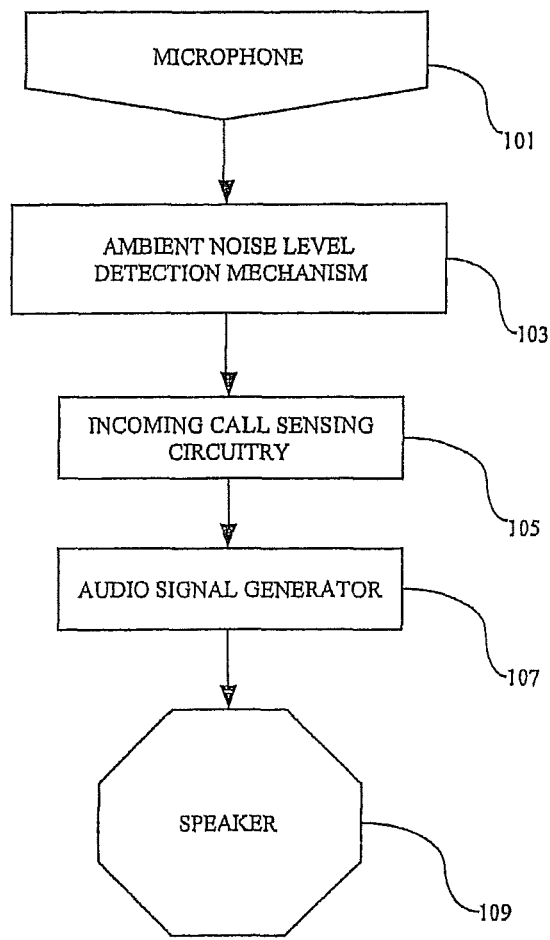
FIG. 1 is a block diagram of an exemplary alerting device that may be utilized for providing ambient noise sensitive alerting.

FIG. 1 is a block diagram of an exemplary alerting device that may be utilized for providing ambient noise sensitive alerting. This device could, but need not, utilize one or more elements that are already present in a portable communications device such as a pager, cellular phone, laptop computer, personal digital assistant (PDAs), or other communications device. A microphone 101 receives acoustic energy from ambient surroundings and converts this acoustic energy into an electrical signal. This acoustic energy includes ambient environmental noise. For example, if the microphone is situated at an airport terminal, the microphone may receive acoustic energy from a multiplicity of passengers engaged in conversations, luggage being wheeled about across tile flooring, the roar of nearby jet engines, as well as sporadic announcements over the airport's public address system. On the other hand, if the microphone is situated in an office conference room, the microphone may receive acoustic energy from climate control equipment, buzzing fluorescent light fixtures, squeaky office chairs, cooling fans on computer equipment, and muted conversations from nearby offices. Microphone 101 may, but need not, be implemented using a piezoelectric transducer, a diaphragm coupled to a coil or capacitor, a loudspeaker, an electret element, or various combinations thereof.

The electrical signal produced by microphone 101 is fed to an ambient noise level detection mechanism 103. Ambient noise level detection mechanism 103 is capable of generating an output that is a function of the ambient noise level as determined by microphone 101. Ambient noise level detection mechanism 103 is implemented using any circuitry that is capable of detecting an average, peak, or cumulative level in the electrical signal across a predetermined or finite time interval. For example, ambient noise level detection mechanism 103 may include an integrator for continuously or repeatedly integrating the electrical signal, wherein the integration optionally utilizes a weighting function. Illustratively, the weighting function may be employed to emphasize recently acquired portions of the electrical signal while deemphasizing portions of the electrical signal that were not recently acquired. Alternatively or additionally, ambient noise level detection mechanism 103 may comprise an averaging circuit for calculating a running average for the amplitude of the electrical signal, a sample-and-hold circuit for storing a signal sample above a predetermined threshold, an envelope detector for detecting the envelope of the electrical signal, a sampling circuit for sampling the electrical signal to generate a sequence of digitized samples, or various combinations thereof.

Ambient noise level detection mechanism 103 feeds a noise level signal representative of ambient noise level to incoming call sensing circuitry 105. Incoming call sensing circuitry 105 detects the presence of an incoming call or electronic message and, in response thereto, activates an audio signal generator 107. Illustratively, incoming call sensing circuitry 105 may be implemented using a microprocessor, logic circuitry, discrete circuitry, or various combinations thereof. Incoming call sensing circuitry 105 is capable of automatically adjusting the volume of an audible alert in accordance with ambient noise. Optionally, incoming call sensing circuitry 105 permits user selection of a default, maximum, or minimum volume level for the audible alert, whereupon the volume of the audible alert is then automatically adjusted in response to ambient noise using the user selected default, maximum, or minimum volume level as an initialization point or absolute limit. Optionally, incoming call sensing circuitry 105 permits user selection of a desired melody or ring tone from a menu of audible alerts, as well as downloading one or more audio files for use as an audible alert.

The volume of audible alert required to engage the attention of a communications device user varies in accordance with the user's environment and, in particular, with the current ambient noise level. Upon detecting an incoming call or message, incoming call sensing circuitry 105 includes a control mechanism responsive to the noise level signal to control the volume of an audible alert generated by audio signal generator 107. For example, incoming call sensing circuitry 105 may adjust the volume of the audible alert to a relatively low level in an environment having low ambient noise such as a quiet meeting room, yet adjust the volume to a relatively high level in an environment having high ambient noise such as an urban outdoor setting.

Due to the fact that ambient noise level detection mechanism 103 may sample ambient noise in a repeated or continuous manner, such sampling could optionally be employed by call sensing circuitry 105 to support functionality beyond adjusting the volume of the audible alert to a desired volume level at the beginning of alerting. For example, the volume of the alert could be varied in a dynamic manner in response to changes in ambient noise that occur substantially in real time. Illustratively, the volume of the alert could, but need not, be adjusted in response to changes in ambient noise level, such as when a user of the alerting device of FIG. 1 goes through a doorway from a quiet room to a noisy room or vice versa.

Audio signal generator 107 is capable of generating electronic signals representing one or more audible alerts, such as a telephone ring tone, a beep, a melody, or various combinations thereof. Audio signal generator 107 may, but need not, be capable of generating electronic signals corresponding to each of a plurality of user-selected audible alerts. Optionally, incoming call sensing circuitry 105 may select different audible alerts as a function of ambient noise level.

Speaker 109 is capable of generating acoustic energy in response to electrical signals produced by audio signal generator 107. Illustratively, speaker 109 may be implemented using a loudspeaker, piezoelectric transducer, audible annunciator, or various combinations thereof. Optionally, microphone 101 and speaker 109 could be implemented using a single device.

Figure 2:
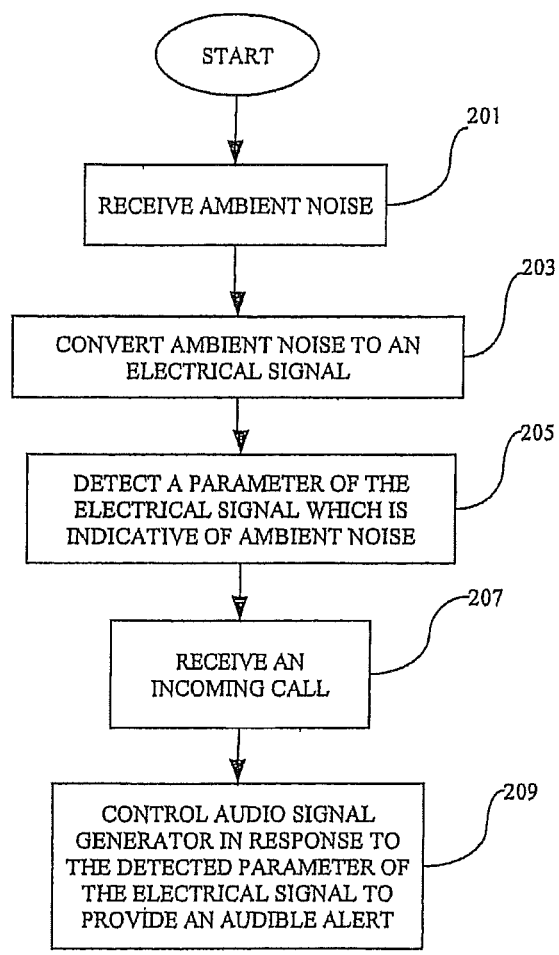
FIG. 2 is a flow diagram of an exemplary process for providing ambient noise sensitive alerting.

FIG. 2 is a flow diagram of an exemplary process for providing ambient noise sensitive alerting. The process commences at block 201 where ambient noise is received. At block 203, the received ambient noise is converted into an electrical signal. Blocks 201 and 203 may be performed, for example, by microphone 101 (FIG. 1). Next, a parameter of the electrical signal that is indicative of ambient noise level is detected (FIG. 2, block 205). This detection process may be performed by ambient noise level detection mechanism 103 (FIG. 1). Illustratively, the detection process detects an average, peak, or cumulative level in the electrical signal across a predetermined or finite time interval. Alternatively or additionally, the detection process continuously or repeatedly integrates the electrical signal, wherein the integration optionally utilizes a weighting function. Illustratively, the weighting function may be employed to emphasize recently acquired portions of the electrical signal while deemphasizing portions of the electrical signal that were not recently acquired. Alternatively or additionally, the detection process calculates a running average for the amplitude of the electrical signal, or stores signal samples that are above a predetermined threshold, or detects the envelope of the electrical signal, or detects the amplitude of the electrical signal, or acquires samples of the electrical signal to generate a sequence of digitized samples, or various combinations thereof.

Next, an incoming call or message is received (FIG. 2, block 207). The audio signal generator is controlled in response to the detected parameter of the electrical signal to provide an audible alert (block 209). Optionally, a first user preference may be accepted which specifies a default, maximum, or minimum volume level for the audible alert, whereupon the volume of the audible alert is then automatically adjusted in response to ambient noise using the user selected default, maximum, or minimum volume level as an initialization point or absolute limit. Optionally, a second user preference may be accepted which specifies a desired melody or ring tone from a menu of audible alerts, or which provides for the downloading of one or more audio files for use as an audible alert, or various combinations thereof.

The volume of audible alert required to engage the attention of a communications device user varies in accordance with the user's environment and, in particular, with the current ambient noise level. For example, the volume of the audible alert may be controlled at block 207 to provide a relatively low volume level in an environment having low ambient noise such as a quiet meeting room, yet the volume of the audible alert will be controlled to provide a relatively high volume level in an environment having high ambient noise such as an urban outdoor setting. Illustratively, the audible alert comprises one or more telephone ring tone, a beep, a melody, or various combinations thereof. Optionally, block 207 may further include the step of selecting one or more audible alerts from a menu of available audible alerts as a function of ambient noise level.

Due to the fact that the ambient noise level may be sampled in a repeated or continuous manner at block 205, such sampling could optionally be employed at block 207 to support functionality beyond adjusting the volume of the audible alert to a desired volume level at the beginning of alerting. For example, the volume of the alert could be varied in a dynamic manner in response to changes in ambient noise that occur substantially in real time. Illustratively, the volume of the alert could, but need not, be adjusted in response to changes in ambient noise level, such as when a user of the alerting device of FIG. 1 goes through a doorway from a quiet room to a noisy room or vice versa.

As described heretofore, the exemplary embodiments can be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing ambient noise sensitive alerting, the method comprising:

receiving ambient noise via a microphone;

converting the ambient noise to an electrical signal;

detecting a parameter of the electrical signal, the parameter indicative of the ambient noise, wherein detecting the parameter of the electrical signal comprises (i) detecting peak level and cumulative level for the electrical signal across a predetermined time interval, (ii) calculating a running average of an amplitude of the electrical signal, storing samples of the electrical signal that are above a predetermined threshold, detecting an envelope of the electrical signal, detecting the amplitude of the electrical signal, and acquiring samples of the electrical signal to generate a sequence of digitized samples, and (iii) continuously integrating the electrical signal using a weighting function that emphasizes recently acquired portions of the electrical signal and deemphasizes portions of the electrical signal that were not recently acquired;

accepting a user preference specifying a default volume level, maximum volume level, and minimum volume level for an audible alert and a desired ring tone from a menu of audible alerts;

sensing an incoming communication;

controlling volume of the audible alert of the incoming communication in response to the parameter of the electrical signal, the controlling the volume including automatically adjusting the volume of the audible alert in response to the parameter using the default volume level as an initialization point, the maximum volume level as a maximum limit, and the minimum volume level as a minimum limit; and repeatedly detecting the parameter of the electrical signal and dynamically controlling the volume of the audible alert in response to the parameter.

* * * * *